United States Patent

[11] 3,625,528

| [72] | Inventor | Ira H. Sage<br>Peoria, Ill. |
|---|---|---|
| [21] | Appl. No. | 12,909 |
| [22] | Filed | Feb. 20, 1970 |
| [45] | Patented | Dec. 7, 1971 |
| [73] | Assignee | Caterpillar Tractor Co.<br>Peoria, Ill. |

[54] CHUCK ASSEMBLY WITH CENTRIFUGAL TIGHTENING MEANS
7 Claims, 3 Drawing Figs.

[52] U.S. Cl. .................................................. 279/1 C,
228/2, 279/51
[51] Int. Cl. ...................................................... B23b 31/14
[50] Field of Search ......................................... 279/1 C, 1
SG, 46, 51, 102; 228/2

[56] References Cited
UNITED STATES PATENTS

| 2,686,682 | 8/1954 | Csaki .......................... | 279/1 C UX |
| 3,396,893 | 8/1968 | Cress et al. ................ | 228/2 |
| 2,367,863 | 1/1945 | Grey ........................... | 279/1 C UX |
| 3,460,734 | 8/1969 | Vill et al. .................... | 228/2 |
| 3,252,667 | 5/1966 | Miller .......................... | 279/1 C UX |
| 3,512,792 | 5/1970 | Farley et al. ............... | 279/51 |

*Primary Examiner*—William S. Lawson
*Assistant Examiner*—James F. Coan
*Attorney*—Fryer, Tjensvold, Feix, Phillips & Lempio ABSTRACT: A chuck assembly including chucking means such as a collet sleeve for engaging a workpiece wherein the chucking means are tightened upon the workpiece in response to centrifugal force developed by rotation of the chuck.

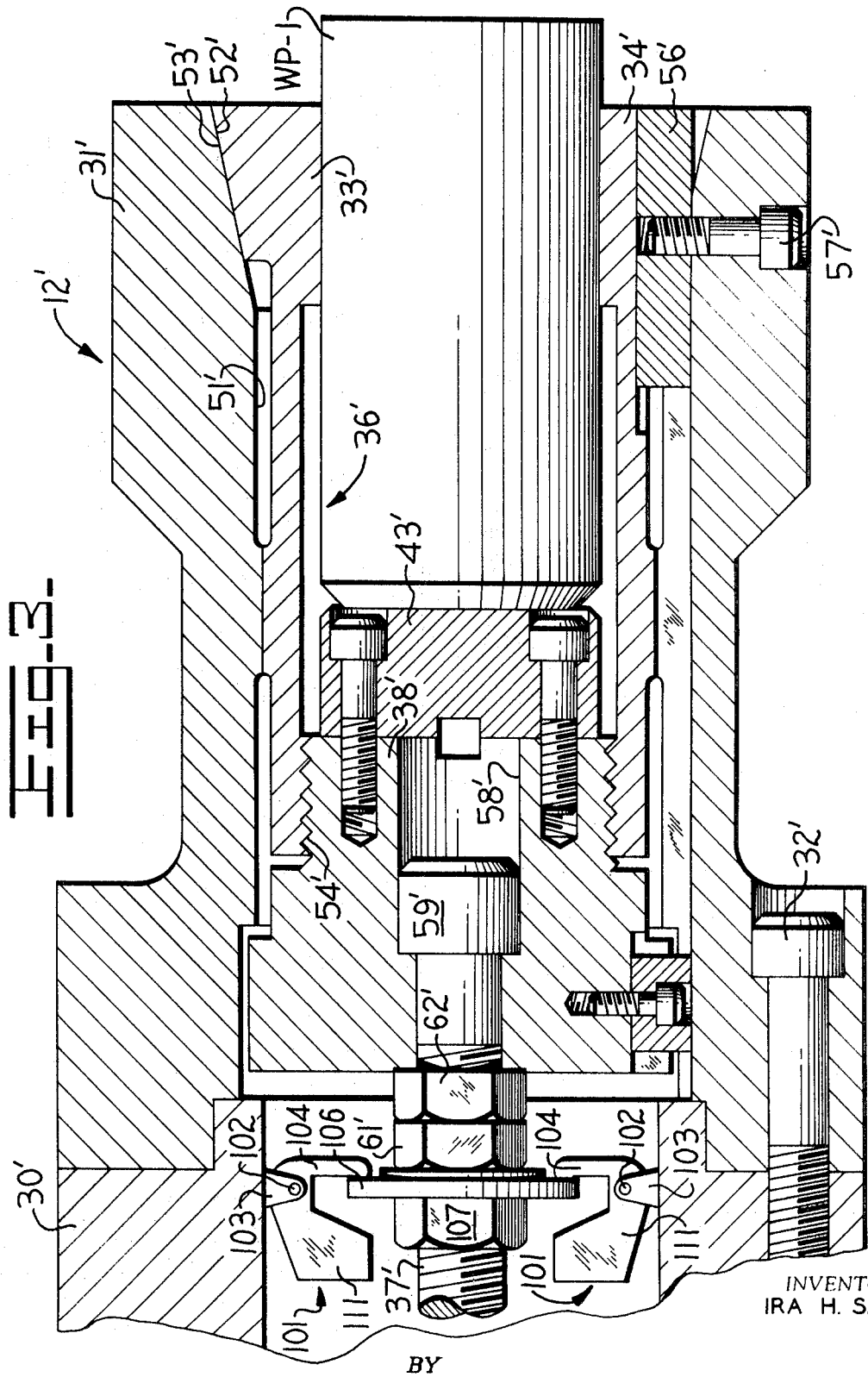

CHUCK ASSEMBLY WITH CENTRIFUGAL TIGHTENING MEANS

The present invention relates to chuck assemblies. More particularly, it relates to chuck assemblies which are urged into engagement upon a workpiece by means responsive to centrifugal force to overcome a tendency of the chucking members to open and release the workpiece during rotation of the chuck assembly.

The present invention is intended to overcome the tendency of chuck assemblies to release a workpiece under the influence of centrifugal force during rotational operation. This problem is particularly apparent, for example, where a chuck assembly is employed with workpieces having relatively large diameters or where the chuck assembly is operating at high speeds of rotation such as in conventional friction welding machines. Under conditions such as those described above, the chuck may tend to open up and release the workpiece.

In one embodiment of a chuck assembly described below for overcoming this problem, the workpiece is gripped or engaged by a collet sleeve which is axially movable within a chuck body for engaging or releasing the workpiece. However, it will be apparent from the following description that the present invention may also include other types of chucks, for example, those employing jaws to grip the workpiece. Centrifugal force may be similarly employed in such chucks to prevent the chuck from opening or releasing a workpiece during rotational operation.

Accordingly, it is an object of the present invention to provide a chuck assembly which tends to be tightened upon a workpiece in response to the centrifugal force developed during rotational operation of the chuck.

Other objects and advantages of the present invention are made apparent in the following description having reference to the accompanying drawings.

IN THE DRAWINGS

FIG. 3 is a centrally sectional view of another chuck assembly embodying the invention.

Figure 1:
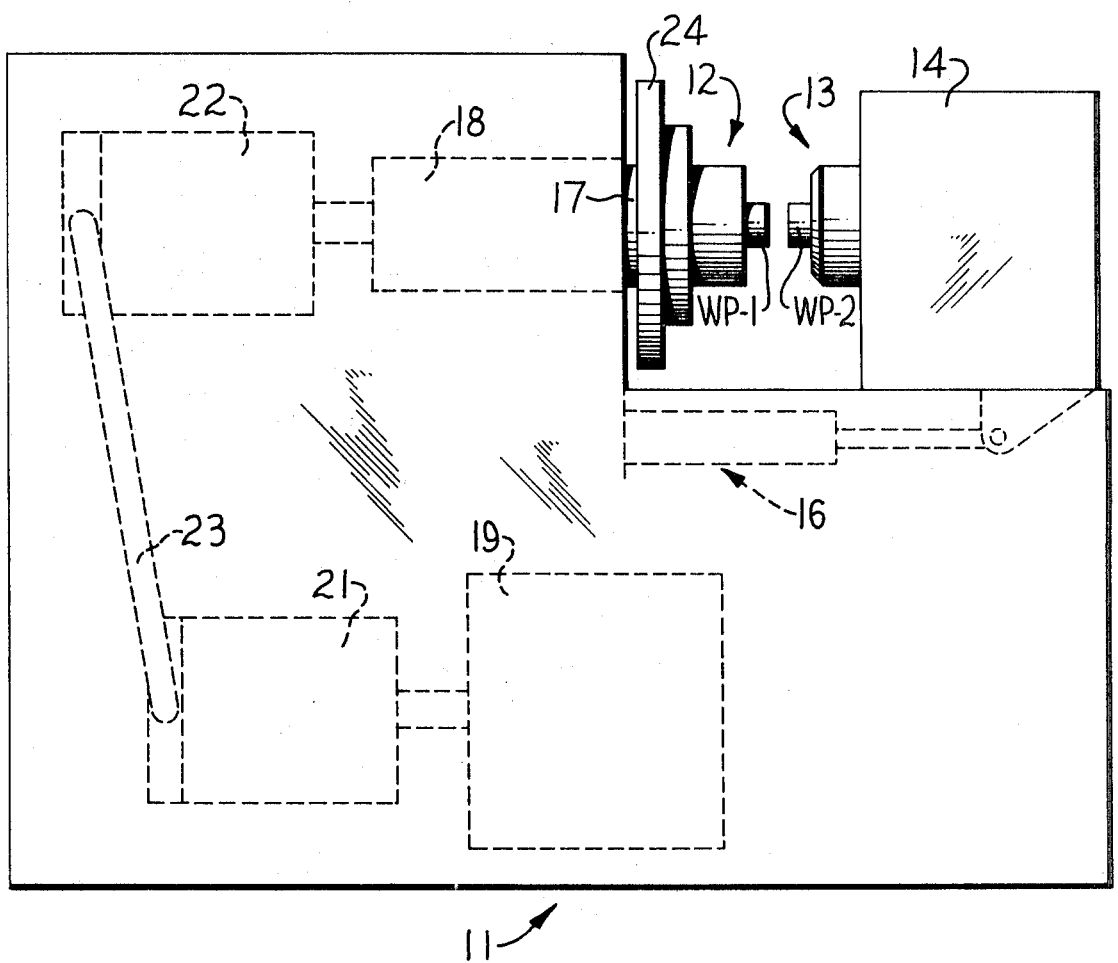
FIG. 1 is a side elevation view, in diagrammatic form, of a friction welding machine.

A friction welding machine is illustrated in FIG. 1 as an exemplary setting for the chuck assembly of the present invention. The machine includes a frame 11 with two parts to be welded, workpieces WP-1 and WP-2 mounted respectively within chucks 12 and 13. The chuck 13 is secured against rotation upon a tailstock fixture 14. The tailstock fixture is mounted for axial movement on the machine frame under the influence of a load cylinder 16. The load cylinder 16 is operable to urge the workpieces into axially abutting engagement. The chuck 12 is mounted for rotation on a spindle 17 which is supported upon the machine frame by a bearing assembly 18. An electric motor 19 rotates the spindle 12 through a hydrostatic transmission including a hydraulic pump 21, a hydraulic motor 22 and a manifold 23 between the pump and the motor. One or more inertia weights 24 are mounted for rotation with the spindle in a accordance with conventional inertia welding techniques.

Figure 2:
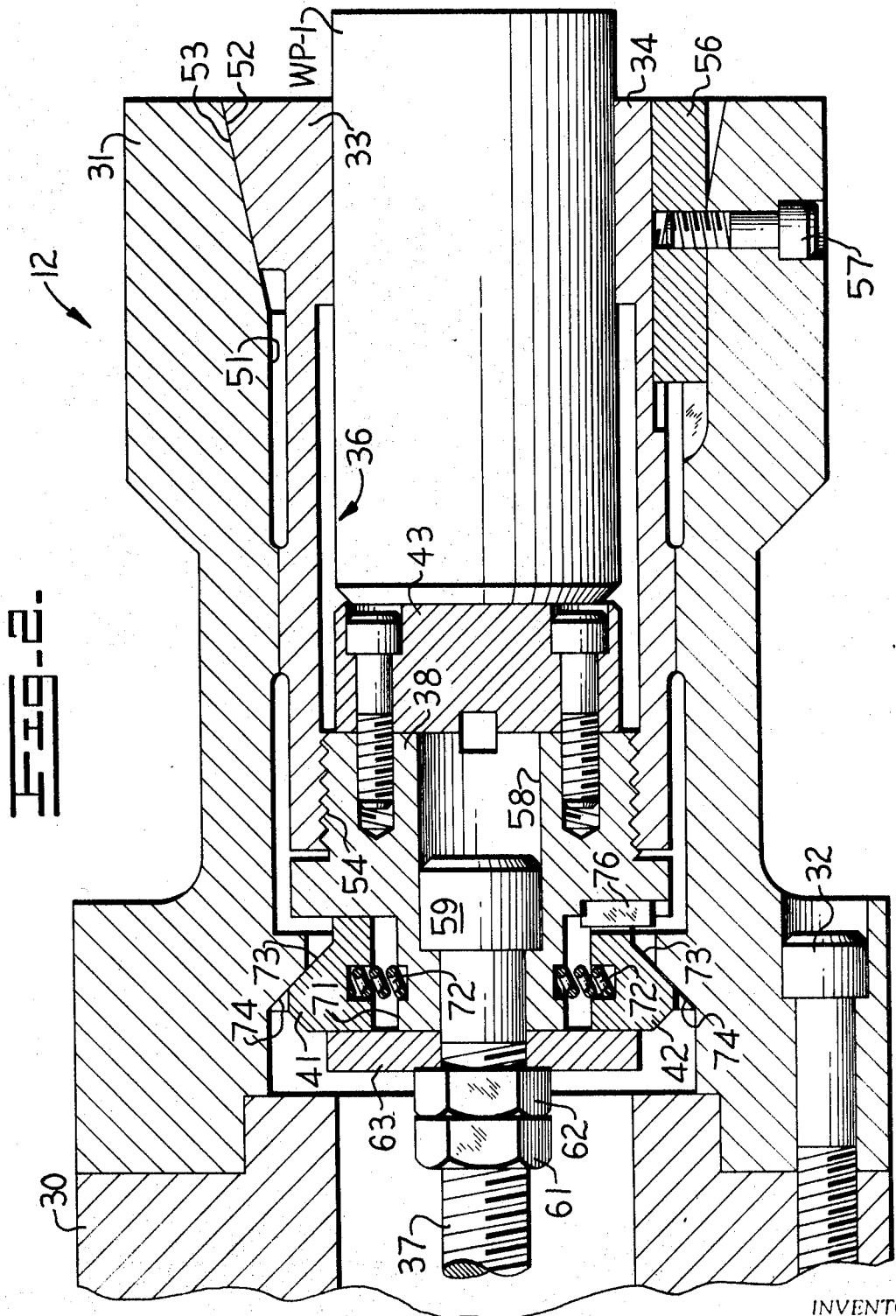
FIG. 2 is a centrally sectioned view of a collet-type chuck assembly for use in a welding machine of the type illustrated in FIG. 1 and embodying the present invention.

The present invention is particularly concerned with construction of the chuck assembly 12, alternate embodiments being illustrated respectively by FIGS. 2 and 3. The embodiment of FIG. 2 is first described below with various elements of the chuck assembly being indicated by suitable reference numerals. Many elements of the chuck assembly of FIG. 3 are similar to those described with reference to FIG. 2. Accordingly, those similar elements of FIG. 3 are indicated by a similar primed numeral.

Having reference now to FIG. 2, the chuck assembly 12 includes a rotatable chuck body 31 and adapter 30 which may be secured to the spindle 17 (see FIG. 1), for example by capscrews such as that indicated at 32.

Chucking members for engaging and gripping the workpiece WP-1 are embodied in portions, indicated for example at 33 and 34 respectively, of a conventional split collet sleeve 36. The collet sleeve is movable relative to the chuck body 31 for engaging or releasing the workpiece WP-1.

A drawbar 37 is coupled with the collet sleeve through a backup block 38 for shifting the collet sleeve relative to the chuck body and initially engaging or releasing the collet sleeve with respect to the workpiece WOP-1.

The chucking members of split sleeve portions 33, 34 are engaged upon the workpiece WP-1 by the drawbar 37 and the chucking assembly 12 is set in rotation together with the spindle 17. Centrifugal force acting upon the split sleeve portions 33, 34 during rotation of the chuck assembly tends to shift them radially outwardly and release the workpiece WP-1.

To overcome this problem, the present invention provides means such as a plurality of wedge-shaped elements, two of which are indicated at 41 and 42, which are responsive to centrifugal force developed by the rotating chuck. The wedge-shaped elements are effectively coupled with collet sleeve 36, by means of the backup block 38, so that they tend to cause the collet sleeve to tighten upon the workpiece WP-1 in response to rotation of the chuck assembly. In this manner, the present invention provides means for overcoming the tendency of the collet to release the workpiece during rotation of the chuck assemblies.

In applications such as conventional friction welding techniques, two workpieces such as those indicated at WP-1 and WP-2 in FIG. 1 are brought into axially abutting engagement while being rotated relative to each other. To assure firm engagement of the chucking members 33, 34 upon the workpiece WP-1 throughout the entire operation, the backup block 38 is also arranged for axially abutting arrangement with the workpiece WP-1 through an adapter plate indicated at 43. The collet sleeve 36 is initially shifted by the drawbar 37 for engagement of the workpiece wp-1. As the chuck assembly is set in rotation, the wedge-shaped elements 41, 42 urge the collet sleeve into engagement with the workpiece in a manner described in greater detail below. As the two workpieces are brought into axial engagement during relative rotation, the workpiece WP-1 tends to rotate within the collet sleeve 36 and chuck body 31. To prevent slippage of the workpiece, axial force acting upon the workpiece !WP-1 is transferred through the backup block 38 to the collet sleeve, causing it to tighten still further upon the workpiece.

To describe the elements of the chuck assembly 12 of FIG. 2 in greater detail, the chuck body 31 includes a cylindrical bore 51 for receiving the split collet sleeve 36. The bore 51 is tapered at its outer end as indicated at 52. The adjacent end of the collet sleeve 36 including the split portions 33, 34, is formed with a tapered surface 53 mating with the tapered surface 52 of the chuck body. Thus, the collet sleeve tends to enter into engagement with the workpiece as it is moved further into the chuck body, or in a leftwardly direction as viewed in FIG. 2.

The collet sleeve 36 is threaded upon the backup block 38, as indicated at 54, with the backup block being free for axial movement within the chuck body. The collet sleeve 36 is prevented from rotating relative to the chuck body 31 by a key 56 which is secured in place by a capscrew 57.

The backup block 38 includes a stepped bore 58 for receiving an enlarged end portion 59 of the drawbar 37. The drawbar may thus shift the backup block 38 in a leftwardly direction and cause the collet sleeve 36 to initially grip the workpiece WP-1. The drawbar also has a pair of locknuts 61, 62 which bear upon the backup plate 38 through another plate 63 permitting the drawbar to shift the back block in a rightwardly direction and release the collet sleeve from the workpiece when desired.

Each of the plurality of wedge-shaped elements, for example that indicated at 41, is arranged for radial movement within an annular groove 71 formed by the backup block 38. Each of the wedge-shaped elements is urged radially outwardly by spring means indicated at 72. The elements also include a tapered surface 73 arranged in engagement with an annularly inclined surface 74 internally formed upon the chuck body 31. Relative rotation between the wedge shaped and the backup block 38 is prevented by keys such as that indicated at 76 in association with the element 42. The wedge-shaped elements such as those indicated at 41, 42 are formed of steel or other dense materials such as cemented carbides to give them substantial weight.

As a chuck assembly is set in rotation, the wedge-shaped elements are urged radially outwardly under the influence of centrifugal force. The elements tend to move in a leftward direction as viewed in FIG. 2, along the inclined surface 74 as they shift radially outwardly within the slot 71. Accordingly, the wedge-shaped elements or weights tend to shift the backup block 38 in a leftwardly direction and increase gripping engagement of the collet sleeve 36 upon the workpiece WP-1.

The alternate chuck assembly embodiment of FIG. 3 includes elements generally similar to those of the embodiment of FIG. 2 except for the centrifugal means which tend to tighten the collet sleeve 36' upon the workpiece WP-1 during rotational operation of the chuck assembly 12'. The wedge-shaped elements 41, 42 of FIG. 2 are replaced by a plurality of flyweights two of which are indicated by the numeral 101. Each of the flyweights is pivoted at 102 to a bracket 103 which is secured to an internal surface of the adapter 30+. A radially inwardly extending arm 104 of each flyweight is arranged in engagement with a flange 106 which is secured to the drawbar 37' by means of a nut 107.

The flyweights of the embodiment of FIG. 3 function in generally a similar manner as the wedge-shaped elements of FIG. 2. As the chuck assembly 12' commences to rotate, weighted portions 111 of the flyweights tend to move radially outwardly with the inwardly extending arms 104 moving in a leftwardly direction as viewed in FIG. 3. The flyweights act through the flange 106 and the drawbar 37 upon the backup block 38' to shift the collet sleeve 36' in a leftwardly direction for increased engagement upon the workpiece WP-1 in generally the same manner as was described above with reference to FIG. 2.

I claim:

1. A chuck assembly for rotatably securing a workpiece comprising
   a hollow rotatable chuck body,
   a plurality of chucking members circumferentially arranged within the chuck body for receiving the workpiece, the chucking members being moveable for engaging and gripping a peripheral surface of the workpiece, the chuck body and chucking members having mating cam surfaces with the chucking members being axially moveable for entering into gripping engagement with the workpiece,
   centrifugal means effectively coupled with the chucking members and associated for rotation with the chuck body, the centrifugal means comprising wedge elements arranged upon internal inclined surfaces formed by the chuck body, the wedge elements being axially moveable relative to the chuck body and coupled with the chucking members, the centrifugal means also being arranged for radially outward movement under the influence of centrifugal force during rotation of the chuck body for exerting an axial force upon the chucking members tending to urge them into gripping engagement upon the workpiece, the centrifugal elements being responsive to rotation of the chuck body for moving the chucking members and urging them into gripping engagement upon the workpiece,
   drawbar means coupled with the chucking members for initially engaging them upon the workpiece.

2. A chuck assembly, for rotatably securing a workpiece, comprising
   a hollow rotatable chuck body,
   a plurality of chucking members circumferentially arranged within the chuck body for receiving the workpiece, the chucking members being moveable for engaging and gripping a peripheral surface of the workpiece, the chuck body and chucking members having mating cam surfaces with the chucking members being axially moveable for entering into gripping engagement with the workpiece,
   centrifugal means being associated for rotation with the chuck body and coupled with the chucking members by means of an axially moveable backup block, the backup block being arranged for abutting axial engagement with the workpiece whereby axial force applied upon the backup block by the workpiece also tends to axially shift the chucking members and urge them into gripping engagement upon the workpiece, the centrifugal means being responsive to rotation of the chuck body for axially moving the chucking members and urging them into gripping engagement upon the workpiece,
   drawbar means being coupled with the chucking members for initially engaging them upon the workpiece.

3. The invention of claim 2 wherein the chucking members are split portions of a collet chuck sleeve.

4. The invention of claim 3 wherein the chuck assembly is mounted upon a rotatable spindle of a friction welding machine, the collet chuck sleeves being adapted for engaging a workpiece and securing it in relative rotation and axially abutting engagement with another workpiece.

5. A collet chuck assembly, comprising
   a rotatable chuck body,
   a split collet sleeve arranged within the chuck body for receiving the workpiece, the collet sleeve and chuck body having mating tapered surfaces with the sleeve being axially moveable relative to the chuck body for gripping the workpiece,
   means effectively coupled with the collet sleeve and associated for rotation with the chuck body, the means being responsive to centrifugal force developed by rotation of the chuck body for axially shifting the collet sleeve and causing it to tighten upon the workpiece,
   the chuck assembly being mounted upon the spindle of a friction welding machine for supporting one of a pair of workpieces which are to be axially engaged and set in relative rotation, the centrifugal means being coupled with the collet sleeve through an axially moveable backup block, the backup block being arranged for axially abutting engagement with the workpiece so that axial force applied upon the backup block by the workpiece also tends to axially shift the collet sleeve and cause it to tighten upon the workpiece.

6. The invention of claim 5 wherein the centrifugal means comprises wedge elements mechanically coupled with the collet sleeve and circumferentially arranged within the chuck body, the chuck body defining inclined surfaces with which the wedge elements are respectively in engagement.

7. The invention of claim 5 wherein the centrifugal means comprises at least one flyweight pivotally mounted upon the chuck housing and mechanically coupled with the collet sleeve.

* * * * *